United States Patent
Van Nee et al.

(10) Patent No.: US 8,867,574 B2
(45) Date of Patent: Oct. 21, 2014

(54) FORMAT OF VHT-SIG-B AND SERVICE FIELDS IN IEEE 802.11AC

(75) Inventors: Didier Johannes Richard Van Nee, De Meern (NL); Albert Van Zelst, Woerden (NL); Simone Merlin, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 13/149,411

(22) Filed: May 31, 2011

(65) Prior Publication Data

US 2011/0299468 A1 Dec. 8, 2011

Related U.S. Application Data

(60) Provisional application No. 61/350,817, filed on Jun. 2, 2010.

(51) Int. Cl.
*H04W 80/00* (2009.01)
*H04L 27/26* (2006.01)

(52) U.S. Cl.
CPC .................. *H04L 27/2613* (2013.01)
USPC ....................................... 370/522

(58) Field of Classification Search
CPC ................................. H04L 27/2602
USPC ....................................... 370/522
See application file for complete search history.

(56) References Cited

U.S. PATENT DOCUMENTS

2011/0249660 A1* 10/2011 Noh et al. ................. 370/338

OTHER PUBLICATIONS

Draft Standard for Information Technology Telecommunications and information exchange between systems. Local and metropolitan area networks. Specific; requirements. Part 11: Wireless LAN Medium Access Control (MAC) and Physical Layer (PHY) specificationsAmendment 5 Enhancements for Higher Throughput,IEEE P802.11N/D9.0 Mar. 1, 2009, pp. 1,2,276-297, XP002606795.
H.Y. Zhang and V. Erceg, et al: Preamble Discussions, https://mentor.ieee.org/802.11 802.llac Nov. 16, 2009, pp. 1-10,XP000002657957.
International Search Report and Written Opinion—PCT/US2011/038908, International Search Authority—European Patent Office—Sep. 13, 2011.
Sampath H., et al: "802.11 ac Preamble", Internet Citation, Jul. 13, 2010, pp. 1-18, XP002657958, Retrieved from the Internet: URL:https://mentor.ieee.org/802.11 /dcn/10/11-10-0876-00-00ac-11ac-preamble. pptx [retrieved on Aug. 31, 2011].
Wahyul Amien Syafei et al: "A design of next generation Gigabit MIMO wireless LAN system", Advanced Communication Technology (ICACT), 2010 the 12th International Conference On, IEEE, Piscataway, NJ, USA, n Feb. 7, 2010, pp. 941-946, XP031653679.
Zhang H et al., "802.11ac Preamble", IEEE 802.11-10/0070R0, [Online] Jan. 18, 2010, pp. 1-11, XP002610760, Retrieved from the Internet: URL:https://mentor.ieee.org/802.11/dcn/10/11-10-0359-00-00ac-802-11ac-preambie.ppt> [retrieved on Nov. 22, 2010].

* cited by examiner

*Primary Examiner* — Melvin Marcelo
(74) *Attorney, Agent, or Firm* — Eric Ho

(57) ABSTRACT

Methods and apparatus for transmitting and receiving frames with various Very High Throughput Signal B (VHT-SIG-B) and Service field formats are provided. Some of these formats may be in accordance with the IEEE 802.11ac amendment to the wireless local area network (WLAN) standard.

128 Claims, 9 Drawing Sheets

FORMAT OF VHT-SIG-B AND SERVICE FIELDS IN IEEE 802.11AC

CROSS-REFERENCE TO RELATED APPLICATIONS

This application claims benefit of U.S. Provisional Patent Application Ser. No. 61/350,817, filed Jun. 2, 2010 and entitled "FORMAT OF VHT-SIG-B IN 802.11AC STANDARD," which is herein incorporated by reference.

BACKGROUND

1. Field

Certain aspects of the present disclosure generally relate to wireless communications and, more particularly, to formatting of the VHT-SIG-B and Service fields for Very High Throughput (VHT) wireless communications.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single access point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes generating a frame having a preamble portion and a data portion, wherein the preamble portion comprises a field indicating a length of useful data in the data portion and wherein both the field and the data portion use the same number of subcarriers; and transmitting the generated frame.

Certain aspects of the present disclosure provide an apparatus for wireless communications. The apparatus generally includes a processing system configured to generate a frame having a preamble portion and a data portion, wherein the preamble portion comprises a field indicating a length of useful data in the data portion and wherein both the field and the data portion use the same number of subcarriers; and a transmitter configured to transmit the generated frame.

Certain aspects of the present disclosure provide an apparatus for wireless communications. The apparatus generally includes means for generating a frame having a preamble portion and a data portion, wherein the preamble portion comprises a field indicating a length of useful data in the data portion and wherein both the field and the data portion use the same number of subcarriers; and means for transmitting the generated frame.

Certain aspects of the present disclosure provide a computer-program product for wireless communications. The computer-program product generally includes a computer-readable medium having instructions executable to generate a frame having a preamble portion and a data portion, wherein the preamble portion comprises a field indicating a length of useful data in the data portion and wherein both the field and the data portion use the same number of subcarriers; and to transmit the generated frame.

Certain aspects of the present disclosure provide a method for wireless communications. The method generally includes receiving a frame having a preamble portion and a data portion, wherein the preamble portion comprises a field indicating a length of useful data in the data portion and wherein both the field and the data portion use the same number of subcarriers; and decoding the data portion based on the field.

Certain aspects of the present disclosure provide an apparatus for wireless communications. The apparatus generally includes a receiver configured to receive a frame having a preamble portion and a data portion, wherein the preamble portion comprises a field indicating a length of useful data in the data portion and wherein both the field and the data portion use the same number of subcarriers; and a processing system configured to decode the data portion based on the field.

Certain aspects of the present disclosure provide an apparatus for wireless communications. The apparatus generally includes means for receiving a frame having a preamble portion and a data portion, wherein the preamble portion comprises a field indicating a length of useful data in the data portion and wherein both the field and the data portion use the same number of subcarriers; and means for decoding the data portion based on the field.

Certain aspects of the present disclosure provide a computer-program product for wireless communications. The computer-program product generally includes a computer-readable medium having instructions executable to receive a frame having a preamble portion and a data portion, wherein the preamble portion comprises a field indicating a length of useful data in the data portion and wherein both the field and the data portion use the same number of subcarriers; and to decode the data portion based on the field.

Certain aspects of the present disclosure provide a method for wireless communications. The method generally includes generating a frame having a preamble portion and a data portion, wherein the preamble portion comprises a field indicating a length of useful data in the data portion, and transmitting the generated frame via a channel. Generating the frame typically includes determining a bandwidth of the channel for the transmitting, generating a block of bits based on the determined bandwidth, and repeating the block of bits a number of times according to the determined bandwidth to generate the field in the frame.

Certain aspects of the present disclosure provide an apparatus for wireless communications. The apparatus generally includes a processing system configured to generate a frame having a preamble portion and a data portion, wherein the preamble portion comprises a field indicating a length of useful data in the data portion, and a transmitter configured to transmit the generated frame via a channel. The processing system is typically configured to generate the frame by determining a bandwidth of the channel for the transmitter to transmit the frame, generating a block of bits based on the determined bandwidth, and repeating the block of bits a number of times according to the determined bandwidth to generate the field in the frame.

Certain aspects of the present disclosure provide an apparatus for wireless communications. The apparatus generally includes means for generating a frame having a preamble portion and a data portion, wherein the preamble portion comprises a field indicating a length of useful data in the data portion, and means for transmitting the generated frame via a channel. The means for generating is typically configured to determine a bandwidth of the channel for transmitting the frame, generate a block of bits based on the determined bandwidth, and repeat the block of bits a number of times according to the determined bandwidth to generate the field in the frame.

Certain aspects of the present disclosure provide a computer-program product for wireless communications. The computer-program product generally includes a computer-readable medium having instructions executable to generate a frame having a preamble portion and a data portion, wherein the preamble portion comprises a field indicating a length of useful data in the data portion, and to transmit the generated frame via a channel. The instructions are executable to generate the frame typically by determining a bandwidth of the channel for transmitting the frame, generating a block of bits based on the determined bandwidth, and repeating the block of bits a number of times according to the determined bandwidth to generate the field in the frame.

Certain aspects of the present disclosure provide a method for wireless communications. The method generally includes receiving a frame having a preamble portion and a data portion, wherein the preamble portion comprises a field indicating a length of useful data in the data portion and wherein the field comprises a plurality of replicated blocks, such that bits of one of the blocks are repeated in each of the blocks; and decoding the data portion based on the field.

Certain aspects of the present disclosure provide an apparatus for wireless communications. The apparatus generally includes a receiver and a processing system. The receiver is typically configured to receive a frame having a preamble portion and a data portion, wherein the preamble portion comprises a field indicating a length of useful data in the data portion and wherein the field comprises a plurality of replicated blocks, such that bits of one of the blocks are repeated in each of the blocks. The processing system is typically configured to decode the data portion based on the field.

Certain aspects of the present disclosure provide an apparatus for wireless communications. The apparatus generally includes means for receiving a frame having a preamble portion and a data portion, wherein the preamble portion comprises a field indicating a length of useful data in the data portion and wherein the field comprises a plurality of replicated blocks, such that bits of one of the blocks are repeated in each of the blocks; and means for decoding the data portion based on the field.

Certain aspects of the present disclosure provide a computer-program product for wireless communications. The computer-program product generally includes a computer-readable medium having instructions executable to receive a frame having a preamble portion and a data portion, wherein the preamble portion comprises a field indicating a length of useful data in the data portion and wherein the field comprises a plurality of replicated blocks, such that bits of one of the blocks are repeated in each of the blocks; and to decode the data portion based on the field.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
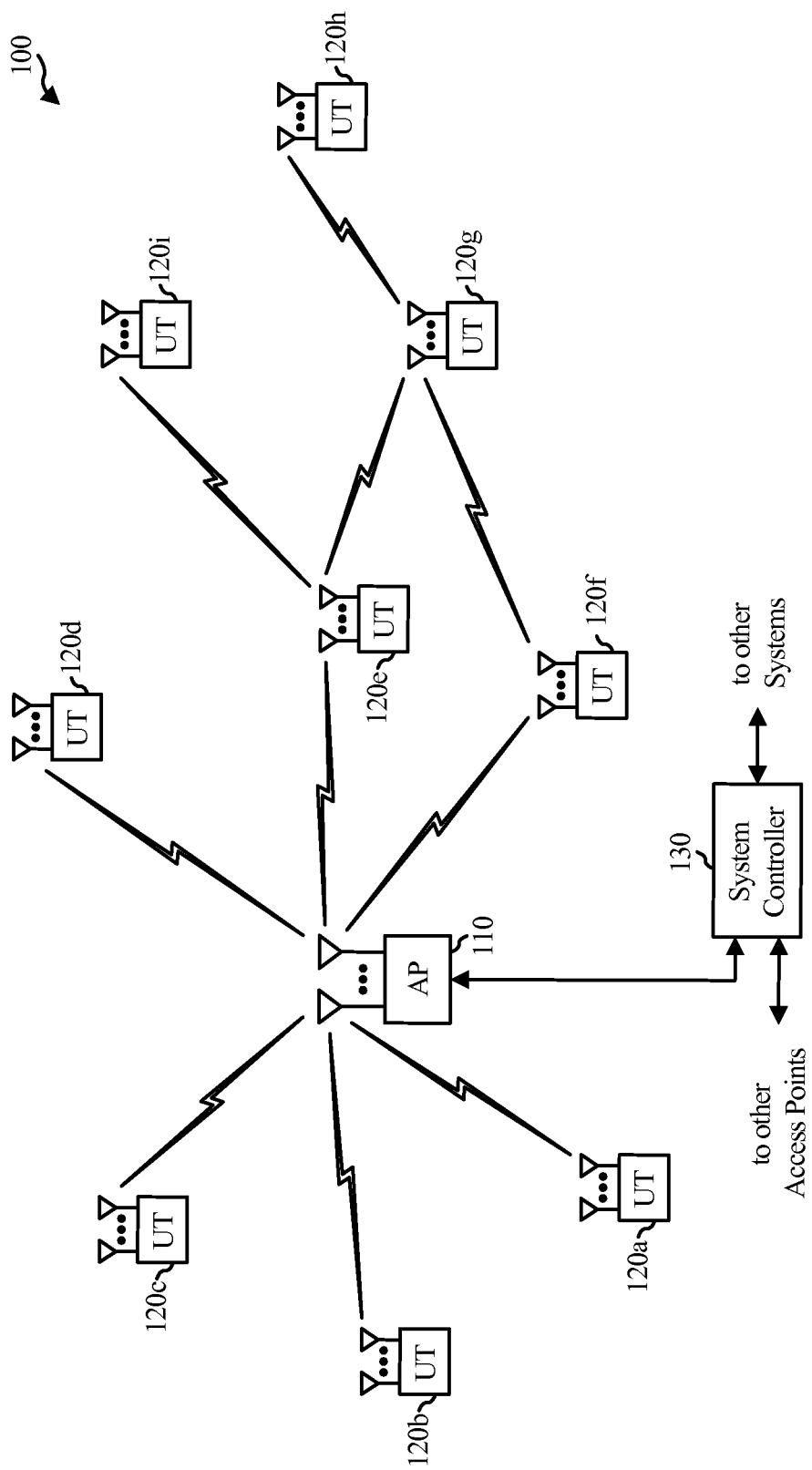
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure.

Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
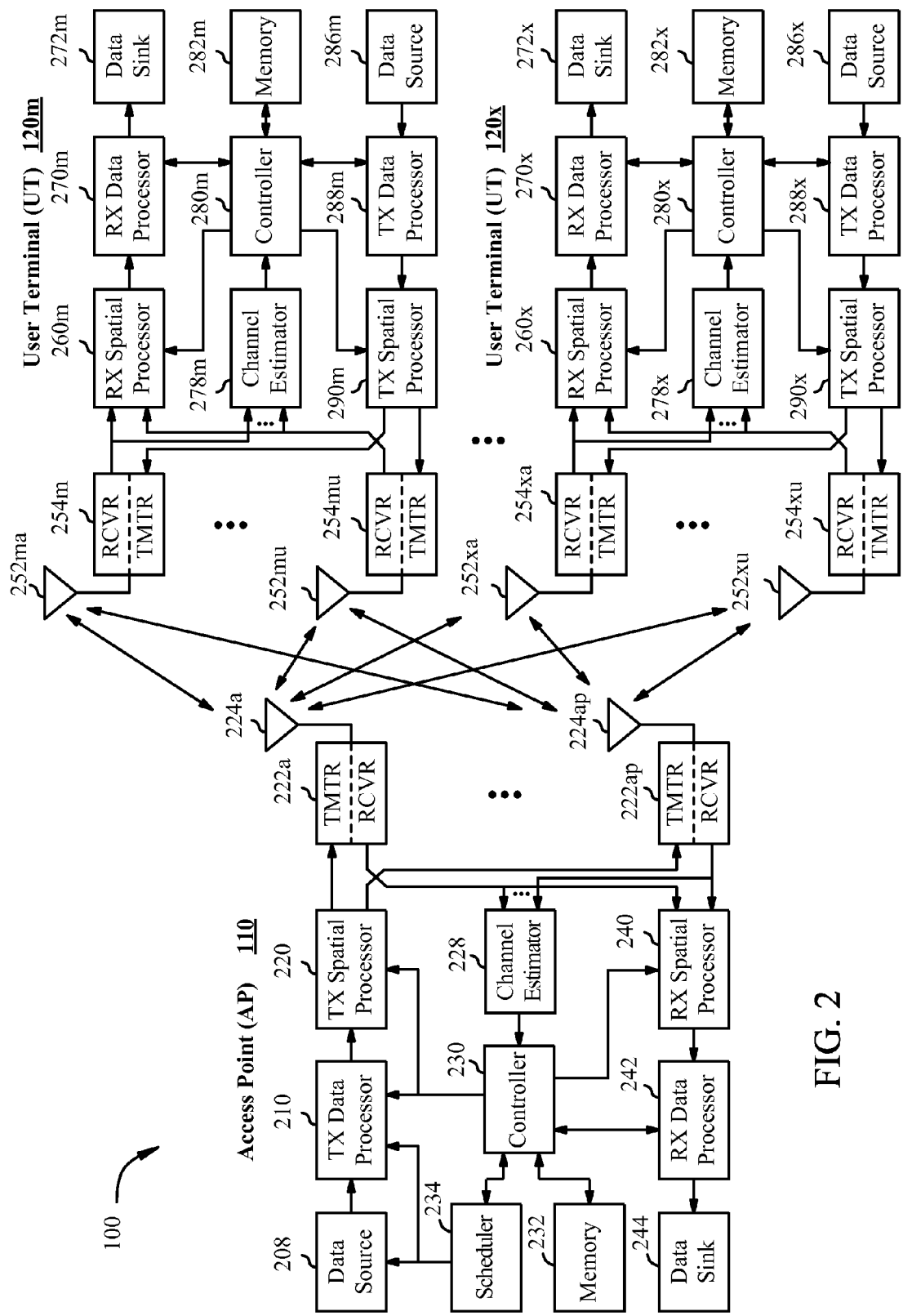
FIG. 2 illustrates a block diagram of an example access point (AP) and user terminals in accordance with certain aspects of the present disclosure.

FIG. 2 illustrates a block diagram of access point 110 and two user terminals 120m and 120x in the MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

An Example Preamble Structure

Figure 3:
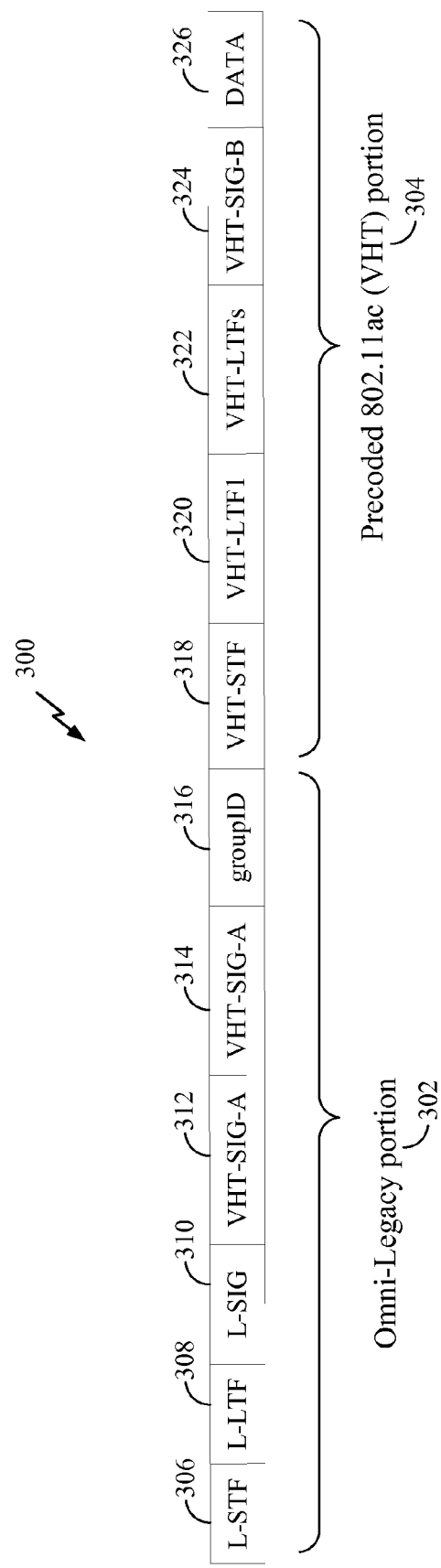
FIG. 3 illustrates an example structure of a preamble portion of a packet in accordance with certain aspects of the present disclosure.

FIG. 3 illustrates an example structure of a preamble 300 in accordance with certain aspects of the present disclosure. The preamble 300 may be transmitted, for example, from the access point (AP) 110 to the user terminals 120 in the MIMO system 100 illustrated in FIG. 1.

The preamble 300 may comprise an omni-legacy portion 302 (i.e., the non-beamformed portion) and a precoded IEEE 802.11ac VHT (Very High Throughput) portion 304. The omni-legacy portion 302 may comprise: a Legacy Short Training Field (L-STF) 306, a Legacy Long Training Field 308, a Legacy Signal (L-SIG) field 310, and two OFDM symbols for VHT Signal A (VHT-SIG-A) fields 312, 314. The VHT-SIG-A fields 312, 314 (i.e., VHT-SIG-A1 and VHT-SIG-A2) may be transmitted omni-directionally and may indicate allocation of numbers of spatial streams to a combination (set) of STAs.

The precoded IEEE 802.11ac VHT portion 304 may comprise a VHT Short Training Field (VHT-STF) 318, a VHT Long Training Field 1 (VHT-LTF1) 320, potentially other VHT Long Training Fields (VHT-LTFs) 322, a VHT Signal B (VHT-SIG-B) field 324, and a data portion 326. The VHT-SIG-B field 324 may comprise one OFDM symbol and may be transmitted precoded/beamformed.

In next generation WLANs, such as the system 100 from FIG. 1, downlink (DL) multi-user (MU) MIMO transmission may represent a promising technique to increase overall network throughput. Robust MU-MIMO reception may involve the AP transmitting all VHT-LTFs 322 to all supported STAs. The VHT-LTFs 322 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

In most aspects of a DL MU-MIMO transmission, a non-beamformed portion of a preamble transmitted from an access point to a plurality of user stations (STAs) may carry a spatial stream allocation field indicating allocation of spatial streams to the STAs. In order to parse this allocation information at a STA side, each STA may need to know its ordering or a STA number in a set of STAs from the plurality of STAs scheduled to receive the MU transmission. This may entail forming groups, wherein a group identification (group ID) field 316 in the preamble for certain aspects may convey, to all supported STAs, the set of STAs (and their order) being transmitted in a given MU-MIMO transmission. For other aspects, the group ID may be indicated as part of another field in the preamble 300, such as within the VHT-SIG-A fields 312, 314 (e.g., bits 4-9 in VHT-SIG-A1).

Figure 4:
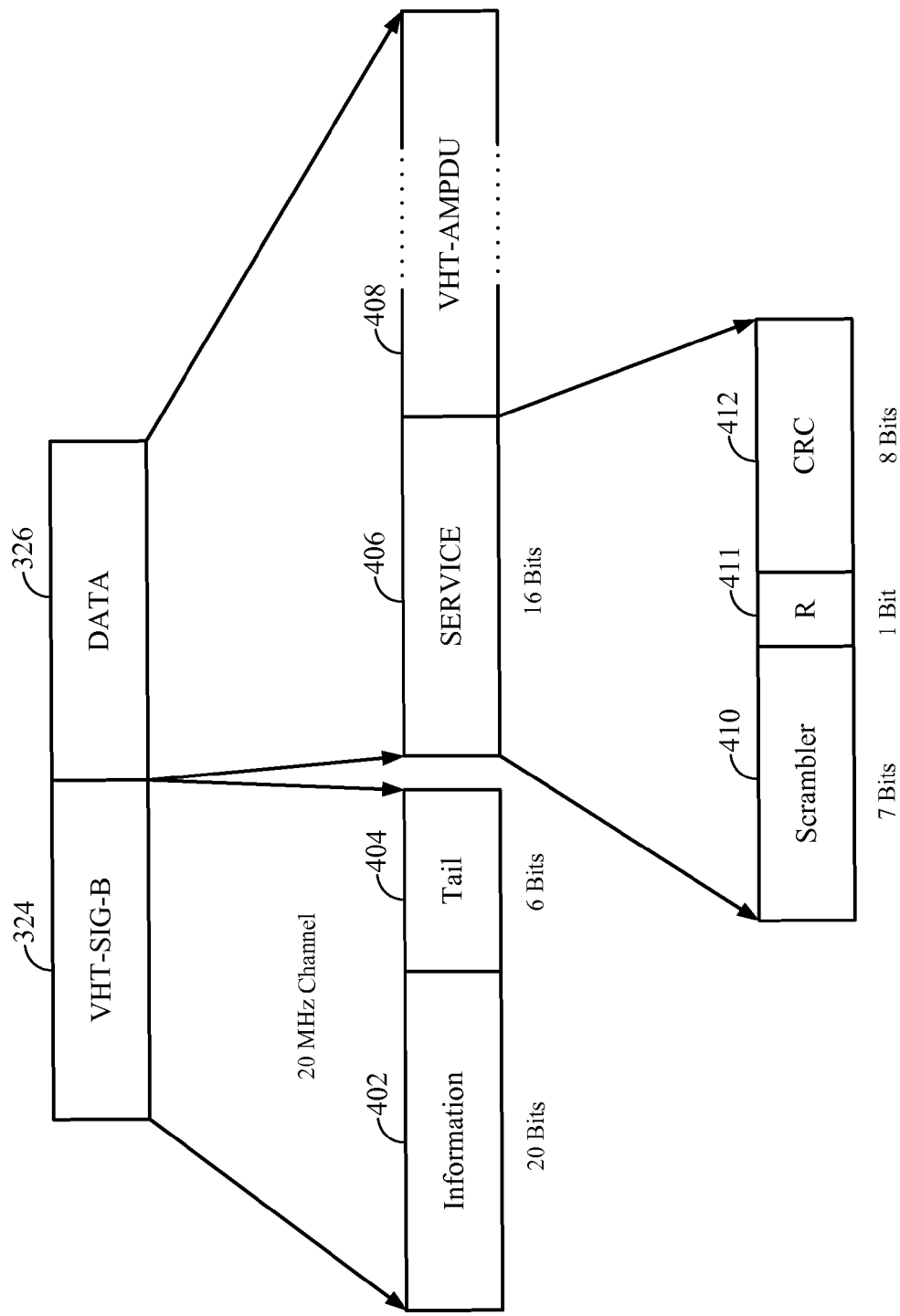
FIG. 4 illustrates an example structure of a Very High Throughput Signal B (VHT-SIG-B) field and a data portion of the packet in FIG. 3, in accordance with certain aspects of the present disclosure.

FIG. 4 illustrates an example structure of the VHT-SIG-B field 324 and the data portion 326 of the packet in FIG. 3 in more detail. The VHT-SIG-B field 324 may indicate the length of useful data in the Physical Layer Convergence Protocol (PLCP) service data unit (PSDU) (e.g., the length of useful data in the data portion 326). For certain aspects, such as multi-user applications, the VHT-SIG-B field 324 may contain user-specific information (e.g., modulation and coding rate) and may be spatially multiplexed for different STAs. As such, the VHT-SIG-B field 324 may comprise a number of information bits 402 followed by a number of tail bits 404.

For a 20 MHz channel for example, the VHT-SIG-B field 324 may comprise 26 bits, which may be divided into 20 information bits and 6 tail bits. For multi-user applications, the 20 information bits may comprise a 16-bit length field (indicating the length of useful data in the data portion) and a 4-bit modulation and coding scheme (MCS) index. For single-user applications, the 20 information bits may comprise a 17-bit length field and 3 reserved bits.

The data portion 326 may comprise a Service field 406 and a VHT aggregated MAC protocol data unit (VHT-AMPDU) 408. For certain aspects, the Service field 406 may comprise two bytes (i.e., 16 bits). Used for scrambler initialization to scramble the data portion, the Service field 406 may comprise a scrambler 410, a number of reserved bits 411, and a cyclic redundancy check (CRC) 412 for the VHT-SIG-B field 324. For certain aspects, the scrambler 410 may comprise 7 bits, and the CRC 412 may comprise 8 bits, leaving one reserved bit 411 as shown in FIG. 4.

Example VHT-SIG-B Field Formats

As described above, the VHT-SIG-B field 324 may include a parameter value which is used for SDMA transmission to every target STA. The VHT-SIG-B field 324 may include information about parameter values which may be set differently according to an individual STA, such as a modulation and coding scheme (MCS) index value, the bandwidth of a channel, and/or a value indicating a number of spatial streams. Although a number of applications or purposes for the VHT-SIG-B field 324 have been defined, several unresolved issues remain with respect to the format of the VHT-SIG-B field. These issues include the number of subcarriers, pilot mapping, the guard interval, and the duration (or length) field within the VHT-SIG-B field. For certain aspects, the VHT-SIG-B field 324 may always use the long guard interval (GI), which may be 800 ns, as opposed to the short GI of 400 ns. The remaining issues are described in detail below.

Number of Subcarriers

At least two options are available for electing the number of subcarriers for the VHT-SIG-B field 324. For certain aspects, the number of subcarriers may be equal to that of the VHT-SIG-A field 312, while for other aspects, the number subcarriers may be equal to the number of subcarriers used for the VHT data portion 326.

In the first option, the subcarriers in all 20 MHz subchannels may be duplicated just like the VHT-SIG-A field 312. However, the pilot mapping for VHT-SIG-B may be the same as the pilot mapping for the data portion 326, rather than using the VHT-SIG-A pilot mapping. Power scaling may be applied to keep the VHT-SIG-B total power equal to the VHT-LTF total power. However, the per-tone power of the VHT-SIG-B field 324 may be different than the per-tone power of the VHT-LTF fields 320, 322. This may be similar to the IEEE 802.11n High Throughput Signal (HT-SIG) field in a Greenfield (GF) packet. With the number of subcarriers in VHT-SIG-B equal to that of VHT-SIG-A, the VHT-SIG-B field may comprise 24 bits in the 20 MHz mode.

According to the second option, the number of subcarriers (i.e., tones) in VHT-SIG-B may be equal to the number of subcarriers used for VHT-DATA (i.e., the data portion 326). In this case, pilot mapping and power scaling may also be the same as the data portion 326. For certain aspects, this means the VHT-SIG-B field 324 may have 64 subcarriers available for a 20 MHz channel, but may only use 56 subcarriers similar to the data portion 326. Out of these 56 subcarriers, 4 subcarriers may be used for pilots. With the number of subcarriers in VHT-SIG-B equal to that of VHT-DATA, the VHT-SIG-B field 324 may comprise 26 bits in the 20 MHz mode.

Before being transmitted, these 26 pre-coded bits may be modulated and encoded, such that a different number of bits are actually transmitted. For example, the 26 pre-coded bits in the VHT-SIG-B field 324 may be modulated and encoded using binary phase-shift keying (BPSK) with a rate=½ convolution encoding to form 52 coding bits that are actually processed for transmitting. However, since different modulation and coding schemes may be used, the term "bits" in the description hereinafter will refer primarily to the number of pre-coded bits in the various fields before modulation and coding.

Figure 5:
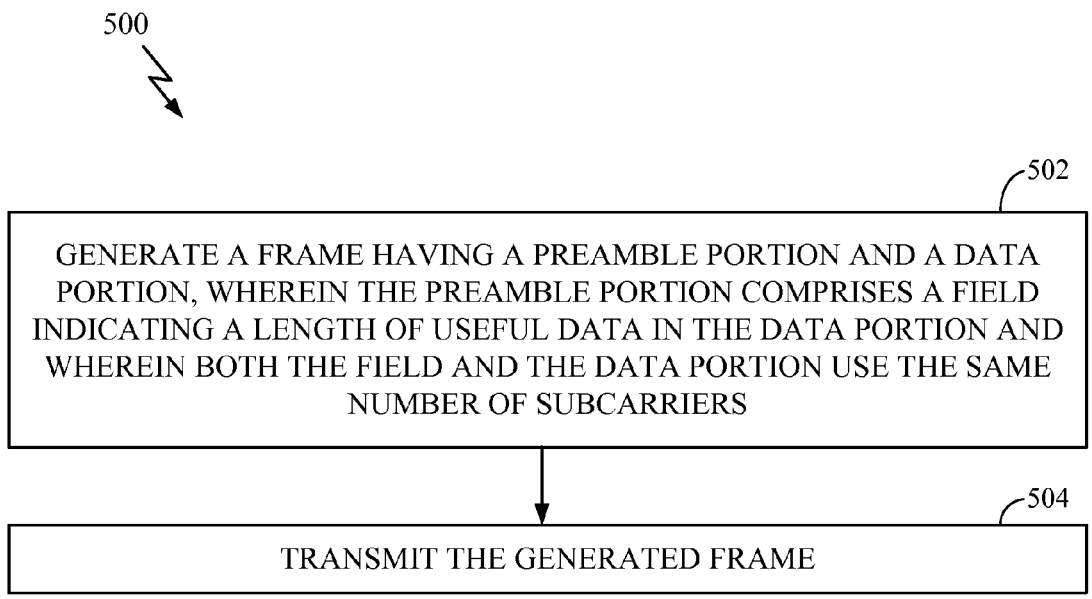
FIG. 5 illustrates example operations that may be performed at an AP to transmit a frame having a field in a preamble portion of the frame, wherein the field and the data portion of the frame have the same number of subcarriers, in accordance with certain aspects of the present disclosure.

FIG. 5 illustrates example operations 500 that may be performed at an access point (AP) 110 to transmit a frame having a field in a preamble portion of the frame, wherein the field and the data portion of the frame have the same number of subcarriers, in accordance with certain aspects of the present disclosure. The operations 500 may begin, at 502, by generating a frame (i.e., a packet) having a preamble portion and a data portion. The preamble portion may comprise all or any portion of the preamble 300 of FIG. 3, and the data portion may be the data portion 326 of FIG. 3. The preamble portion may comprise a field (e.g., a VHT-SIG-B field 324) indicating a length of useful data in the data portion. Both the field and the data portion use the same number of subcarriers (e.g., 56 subcarriers for a 20 MHz channel, 114 subcarriers for a 40 MHz channel, 242 subcarriers for an 80 MHz channel, or 484 subcarriers 160 MHz channel). At 504, the AP may transmit the generated frame.

Figure 6:
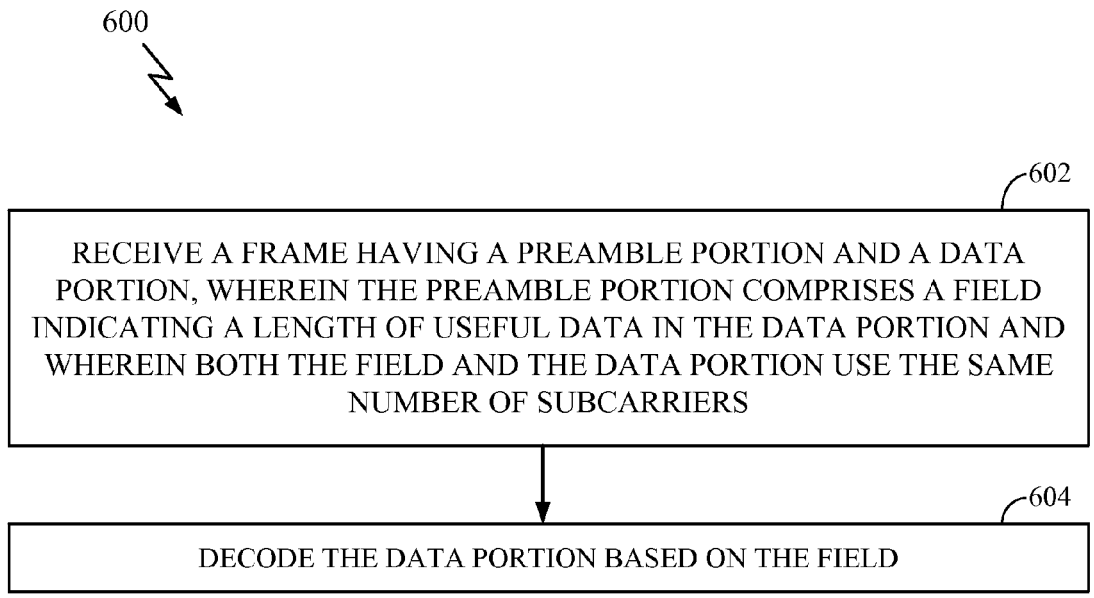
FIG. 6 illustrates example operations that may be performed at a station (STA) to receive a frame having a field in a preamble portion of the frame, wherein the field and the data portion of the frame have the same number of subcarriers, in accordance with certain aspects of the present disclosure.
Figure 6A:
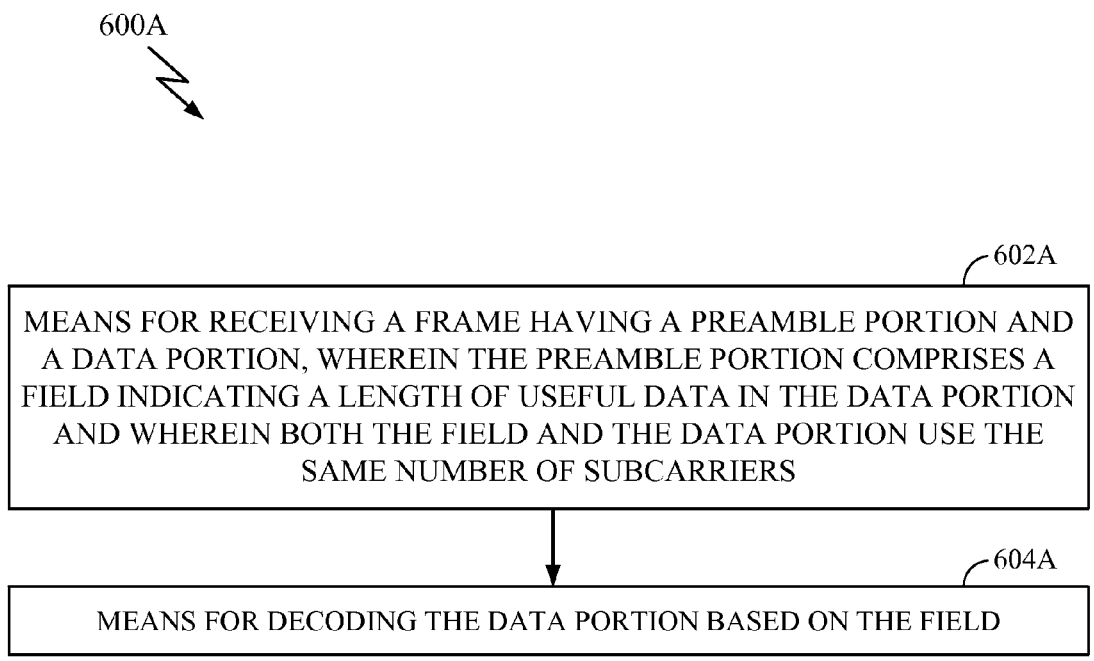
FIG. 6A illustrates example means capable of performing the operations shown in FIG. 6.

FIG. 6 illustrates example operations 600 that may be performed at a station (STA) to receive a frame having a field in a preamble portion of the frame, wherein the field and the data portion of the frame have the same number of subcarriers, in accordance with certain aspects of the present disclosure. The operations 600 may begin, at 602, by receiving a frame having a preamble portion and a data portion. The preamble portion may comprise all or any portion of the preamble 300 of FIG. 3, and the data portion may be the data portion 326 of FIG. 3. The preamble portion may comprise a field (e.g., a VHT-SIG-B field 324) indicating a length of useful data in the data portion. Both the field and the data portion use the same number of subcarriers (e.g., 56 subcarriers for a 20 MHz channel, 114 subcarriers for a 40 MHz channel, 242 subcarriers for an 80 MHz channel, or 484 subcarriers 160 MHz channel). At 604, the STA may decode the data portion based on the field. The STA may stop decoding the data portion after reaching an end of the useful data based on the length of the useful data according to the field.

For certain aspects, a block of bits in the VHT-SIG-B field 324 may be repeated or copied a number of times for higher bandwidths, such as for 40, 80, and 160 MHz modes. This repeating of bits may include both the information bits and the tail bits. Any additional bits for channel bandwidths greater than 20 MHz may be designated as reserved bits. For certain aspects, any reserved bits in the block of bits may also be repeated. Repeating the bits for higher channel bandwidths provides an easy way for the receiver to achieve processing gain via averaging of repeated soft values (e.g., by repeating the tail bits).

Figure 7:
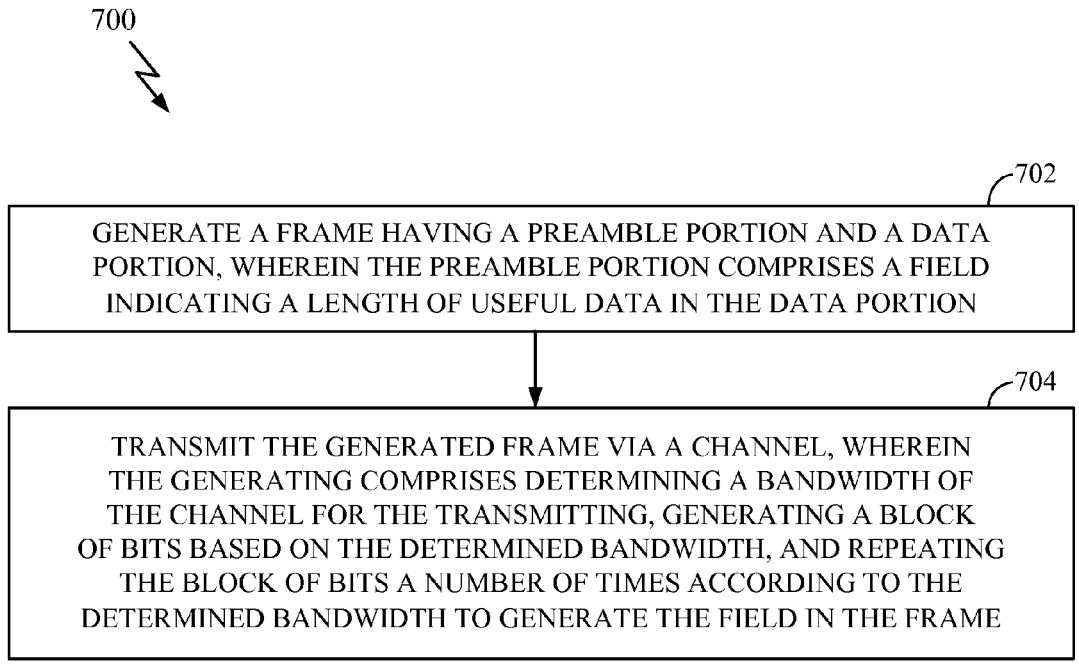
FIG. 7 illustrates example operations that may be performed at an AP to transmit a frame where bits in a field of the preamble portion are repeated based on the channel bandwidth, in accordance with certain aspects of the present disclosure.
Figure 7A:
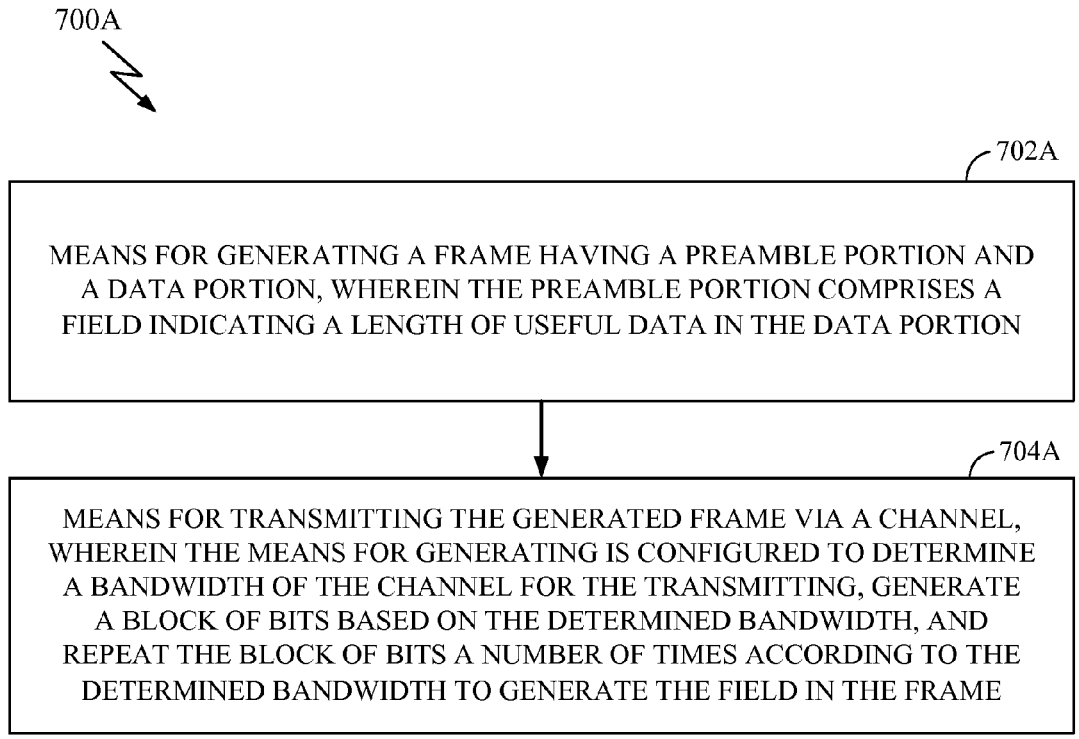
FIG. 7A illustrates example means capable of performing the operations shown in FIG. 7.

FIG. 7 illustrates example operations 700 that may be performed at an access point 110 to transmit a frame where bits in a field of the preamble portion are repeated based on the channel bandwidth, in accordance with certain aspects of the present disclosure. The operations 700 may begin, at 702, by generating a frame having a preamble portion and a data portion. The preamble portion may comprise a field (e.g., a VHT-SIG-B field 324) indicating a length of useful data in the data portion. At 704, the AP may transmit the generated frame via a channel, such as a wireless channel. The bandwidth of the channel may be about 20 MHz, 40 MHz, 80 MHz, or 160 MHz for example. Generating the frame at 702 may comprise determining a bandwidth of the channel for transmitting the frame at 704, generating a block of bits based on the determined bandwidth, and repeating the block of bits a number of times according to the determined bandwidth to generate the field in the frame.

Figure 8:
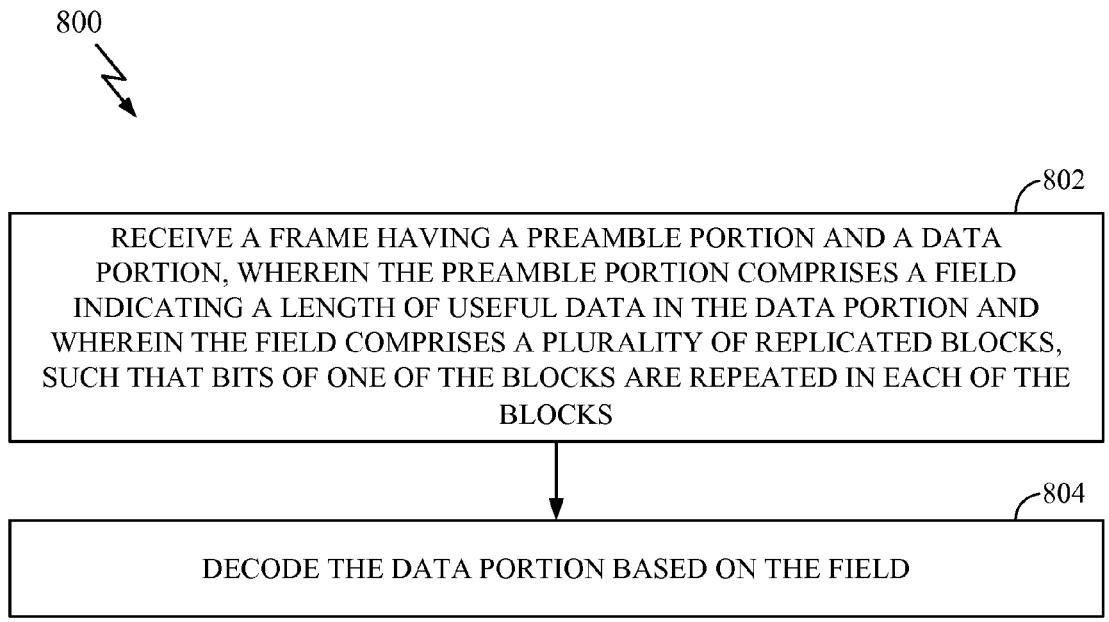
FIG. 8 illustrates example operations that may be performed at a STA to receive a frame where bits in a field of the preamble portion are repeated based on the channel bandwidth, in accordance with certain aspects of the present disclosure.
Figure 8A:
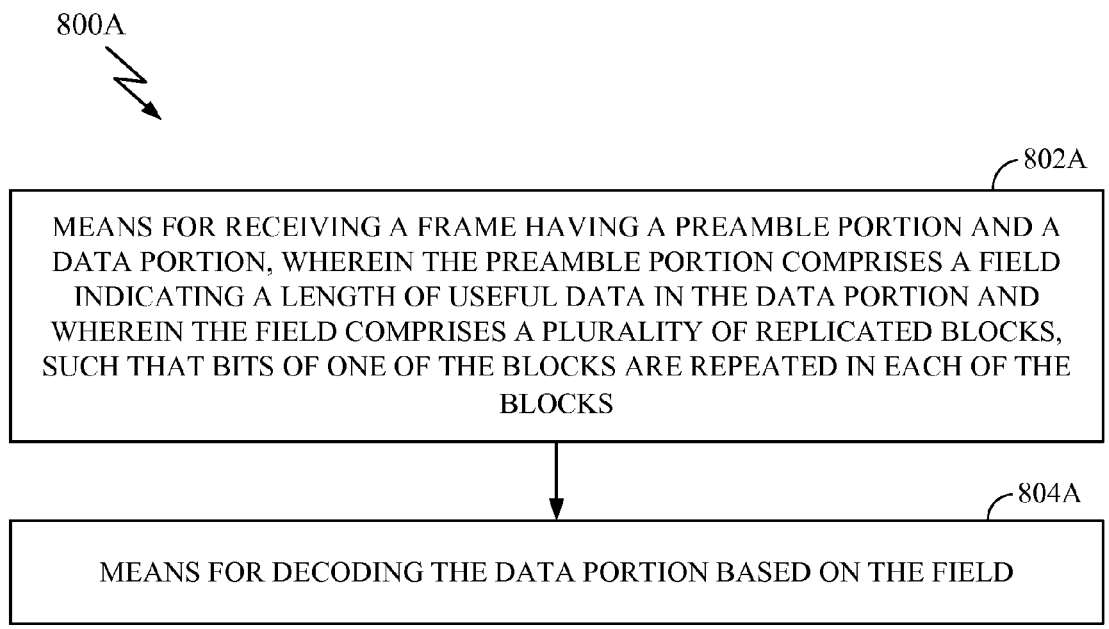
FIG. 8A illustrates example means capable of performing the operations shown in FIG. 8.

FIG. 8 illustrates example operations 800 that may be performed at a STA to receive a frame where bits in a field of the preamble portion are repeated based on the channel bandwidth, in accordance with certain aspects of the present disclosure. The operations 800 may begin, at 802, by receiving a frame having a preamble portion and a data portion as described above. The preamble portion may comprise a field (e.g., a VHT-SIG-B field 324) indicating a length of useful data in the data portion. The field may comprise a plurality of replicated blocks of bits, such that bits of one of the blocks are repeated in each of the blocks. At 804, the STA may decode the data portion based on the field. The STA may stop decoding the data portion after reaching an end of the useful data based on the length of the useful data according to the field.

Figure 9:
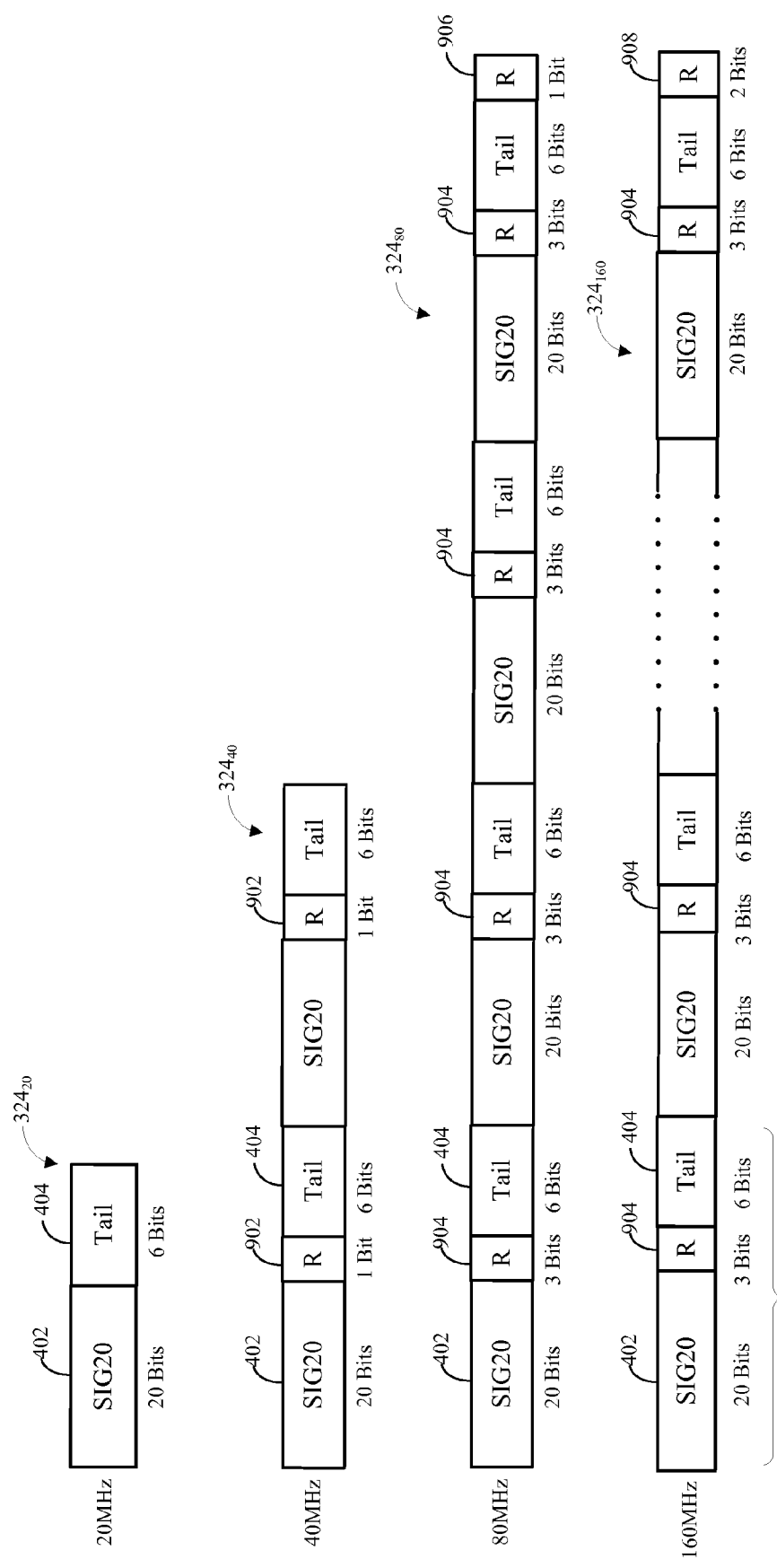
FIG. 9 illustrates an example structure of a VHT-SIG-B field with the bits repeated according to the channel bandwidth, in accordance with certain aspects of the present disclosure.

FIG. 9 illustrates an example structure of a VHT-SIG-B field with the bits repeated according to the channel bandwidth, in accordance with certain aspects of the present disclosure. As described above, the VHT-SIG-B field 324 for the 20 MHz mode (i.e., the 20 MHz VHT-SIG-B field $324_{20}$) may comprise 20 information bits 402 followed by 6 tail bits 404.

The 40 MHz VHT-SIG-B field $324_{40}$ may comprise a block of bits that is repeated twice. Each block of bits in the 40 MHz VHT-SIG-B field $324_{40}$ may comprise 20 information bits, a single reserved bit 902, and 6 tail bits for a total of 27 bits in the block. By repeating the block of 27 bits two times, the 40 MHz VHT-SIG-B field $324_{40}$ comprises a total of 54 bits.

Similarly, the 80 MHz VHT-SIG-B field $324_{80}$ may comprise a block of bits that is repeated four times. Each block of bits in the 80 MHz VHT-SIG-B field $324_{80}$ may comprise 20 information bits, a block of three reserved bits 904, and 6 tail bits for a total of 29 bits in the block. By repeating the block of 29 bits four times and adding a single reserved bit 906 at the end of the field, the 80 MHz VHT-SIG-B field $324_{80}$ may comprise a total of 117 bits (or at least 116 bits without the reserved bit 906).

Likewise, the 160 MHz VHT-SIG-B field $324_{160}$ may comprise a block of bits that is repeated eight times. Each block of bits in the 160 MHz VHT-SIG-B field $324_{160}$ may comprise 20 information bits, a block of three reserved bits 904, and 6 tail bits for a total of 29 bits in the block, the same block of bits as in the 80 MHz mode. By repeating the block of 29 bits eight times and adding two reserved bits 908 at the end of the field, the 160 MHz VHT-SIG-B field $324_{160}$ may comprise a total of 234 bits (or at least 232 bits without the two reserved bits 908).

Pilot Mapping

The pilot mapping of the VHT-SIG-B field 324 is currently an unresolved issue. For certain aspects, the VHT-SIG-B field 324 may use single stream pilots. The VHT-SIG-B field 324 may use the same pilots as those used in the data portion (i.e., the DATA symbols), using DATA symbol number 0 for VHT-SIG-B. This means that the first DATA symbol and VHT-SIG-B both use DATA symbol number 0 (e.g., for scrambling, using zero phase shift). The pilot scrambling sequence may begin with value 0 at the L-SIG field 310, so the VHT-SIG-B field 324 may have pilot sequence number 3 (L-SIG, VHT-SIG-A1, VHT-SIG-A2, and then VHT-SIG-B, assuming the pilot scrambling pattern is not applied to VHT-STF and VHT-LTF symbols).

Length Field

The field (or, more properly, sub-field) in the VHT-SIG-B field indicating the length of useful data also remains an unresolved issue. This length (or duration) field may be expressed on a per STA basis (i.e., a per-user length). With such a per-user length, power savings may be accomplished by stopping the decoding once the per-user length is reached. A per-user length may also remove the aggregated MAC protocol data unit (A-MPDU) restriction and may allow the use of physical layer (PHY) padding as in IEEE 802.11n, rather than MAC frame padding.

Some early proposals for the VHT-SIG-B field 324 had a 10-bit per-user symbol duration field, which covered the maximum packet duration of more than 4 ms for a long GI. Other fields in the 26-bit VHT-SIG-B field for these early proposals included a 4-bit MCS index, a 4-bit CRC (now removed to the Service field 406), 6 tail bits, 1 aggregation bit, and 1 coding bit. However, a 10-bit duration field may not be long enough for the maximum number of bytes per symbol. For example, the highest rate mode of 160 MHz modulated with 256-QAM and a coding rate of 5/6 entails 3120 bytes per symbol, which indicates at least 12 bits ($2^{12}$=4096). Accordingly, one option is to use the Service field 406 to indicate the length of useful data in the data portion 326.

Example Service Field Formats

Various options for using the Service field 406 to indicate the length of useful data in the data portion 326, rather than the VHT-SIG-B field 324, are presented below.

For certain aspects as a first option, the Service field 406 remains as a two-byte data field. Out of the 16 bits, 12 bits may be used to indicate the length of useful data, and 4 bits may be used for the scrambler initialization. Since the scrambler uses 7 bits, the last 3 bits may be designated to always be a certain value, such as all zeroes. The 4 scrambler initialization bits of the Service field 406 may be combined with the 3 fixed bits to form the scrambler initialization pattern. This leaves fifteen different scrambling patterns, which may be enough.

For other aspects as a second option, the Service field may be extended to 3 bytes (24 bits). With 3 bytes, the Service field 406 may comprise 7 bits for scrambler initialization, 12 bits for expressing the number of bytes in the last symbol (i.e., for indicating the length of useful data), a 4-bit CRC, and 1 reserved bit.

For other aspects as a third option, the Service field 406 may be extended to 3 bytes. With 24 bits, the Service field may comprise 7 bits for scrambler initialization and 17 bits for expressing the total number of bytes (i.e., for indicating the length of useful data). In this case, the VHT-SIG-B field 324 need not be used or included in the preamble.

For other aspects as a fourth option, the Service field 406 may be extended to 4 bytes (32 bits). With 4 bytes, the Service field may comprise 6 bits for scrambler initialization (the seventh bit is always understood to be a fixed value, such as 0), 18 bits for expressing the total number of bytes (i.e., for indicating the length of useful data), and an 8-bit CRC.

For other aspects as a fifth option, the Service field may be extended to 4 bytes. With 32 bits, the Service field 406 may comprise 4 bits for scrambler initialization (the last three bits are understood to always be a fixed value, such as 000), 20 bits for expressing the total number of bytes (i.e., for indicating the length of useful data), and an 8-bit CRC.

Example 24-Bit VHT-SIG-B Field Formats

If the VHT-SIG-B field 324 comprises 24 bits in the 20 MHz mode (e.g., when the number of subcarriers in VHT-SIG-B is equal to that of VHT-SIG-A), then there are various suitable formats for VHT-SIG-B. For example, the VHT-SIG-B field may comprise a 9-bit duration field indicating the length of useful data, a 4-bit MCS index, a 4-bit CRC, 6 tail bits, and 1 coding bit for a total of 24 bits. However, as described above, the 9-bit duration field is too short to express the length of useful data as a number of symbols.

Accordingly, one option is to use the 9-bit duration field to express a number of 512-byte blocks, which would equal $\lceil L/512 \rceil$, where L is the length in bytes and $\lceil . \rceil$ is the ceiling function. In concert with this, 9 bits in the Service field 406 may be used to indicate the number of bytes in the last block of the 1-512 bytes expressed by the 24-bit VHT-SIG-B field. The bits of the Service field may signal either $512 \lceil L/512 \rceil - L$ (i.e., the number of missing bytes in the last block) or $L - 512 \lfloor L/512 \rfloor$ (i.e., the number of bytes in the last block, where $\lfloor . \rfloor$ is the floor function).

The previous example assumes that the total length per user may be up to 18 bits (9 bits from the VHT-SIG-B field and 9 bits from the Service field 406). However, if 10 bits are available for a length sub-field in VHT-SIG-B (for instance, if no coding bit is used), then the VHT-SIG-B length sub-field may signal $\lceil L/256 \rceil$. In concert with this, 8 bits in the Service field may be used to indicate the number of bytes in the last block=$L - 256 \lfloor L/256 \rfloor$. For other aspects, if only a 16-bit length field is desired, then the VHT-SIG-B length sub-field may signal $\lceil L/256 \rceil$ using only 8 bits. In this case, 8 bits in the Service field 406 may be used to indicate the number of bytes in the last block=$L - 256 \lfloor L/256 \rfloor$.

Figure 5A:
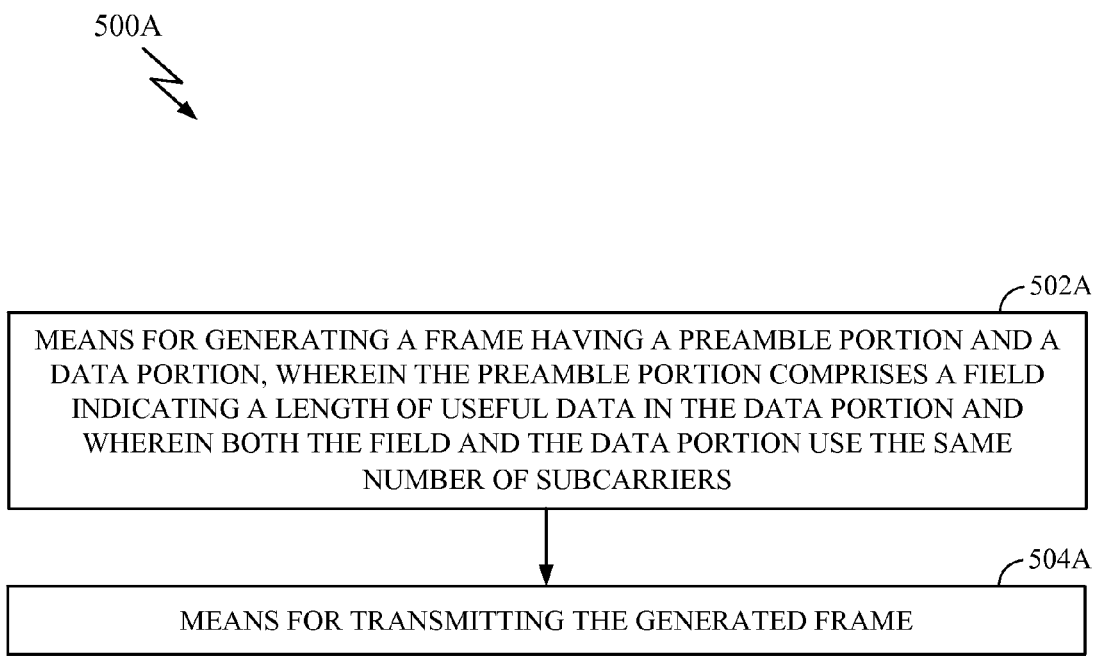
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the Figures, those operations may have corresponding counterpart means-plus-function components with similar numbering. For example, operations 500 illustrated in FIG. 5 correspond to means 500A illustrated in FIG. 5A.

As example means, the means for transmitting may comprise a transceiver or transmitter, such as the transmitter unit 222 of the access point 110 illustrated in FIG. 2. The means for receiving may comprise a transceiver or a receiver, such as the receiver unit 254 of the user terminal 120 depicted in FIG. 2. The means for generating, means for processing, or means for determining may comprise a processing system, which may include one or more processors, such as the TX data processor 210, the scheduler 234, and/or the controller 230 of the access point 110 illustrated in FIG. 2. The means for decoding, means for processing, or means for determining may comprise a processing system, which may include one or more processors, such as the RX data processor 270 and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   generating a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers;
   applying power scaling to the frame to keep total power of the VHT-SIG-B field equal to total power of a preamble training field while allowing per-tone power of the VHT-SIG-B field to differ from per-tone power of the preamble training field; and
   transmitting the generated frame.

2. The method of claim 1, wherein the transmitting comprises transmitting the frame over a channel, wherein a bandwidth of the channel is about 20 MHz, and wherein the VHT-SIG-B field comprises 26 pre-coded bits.

3. The method of claim 2, wherein the transmitting comprises transmitting the frame over a channel, wherein a bandwidth of the channel is about 80 MHz, and wherein the VHT-SIG-B field comprises four blocks with the same 29 pre-coded bits repeated in each block.

4. The method of claim 1, wherein the transmitting comprises transmitting the frame over a channel, wherein a bandwidth of the channel is about 20 MHz, and wherein the number of subcarriers is 56.

5. The method of claim 4, wherein the number of subcarriers comprises 4 pilot subcarriers and 52 data subcarriers for both the VHT-SIG-B field and the data portion.

6. The method of claim 1, wherein the transmitting comprises transmitting the frame over a channel, wherein a bandwidth of the channel is about 40 MHz, and wherein the number of subcarriers is 114.

7. The method of claim 1, wherein the generating comprises:
   determining a bandwidth of a channel for the transmitting;
   generating a block of bits based on the determined bandwidth; and
   repeating the block of bits a number of times according to the determined bandwidth to generate the VHT-SIG-B field in the frame.

8. The method of claim 7, wherein the determined bandwidth is about 160 MHz, wherein the block of bits comprises 29 pre-coded bits, and wherein the repeating comprises repeating the block of bits eight times such that the VHT-SIG-B field comprises at least 232 pre-coded bits.

9. The method of claim 1, wherein the data portion comprises another field used for scrambler initialization, wherein the other field comprises a cyclic redundancy check (CRC) associated with the other field indicating the length of the useful data.

10. The method of claim 1, wherein the VHT-SIG-B field comprises a long guard interval (GI) of about 800 ns.

11. An apparatus for wireless communications, comprising:
    a processing system configured to generate a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarrier; and
    a transmitter configured to transmit the generated frame;
    wherein the processing system is configured to apply power scaling to the frame to keep total power of the VHT-SIG-B field equal to total power of a preamble training field while allowing per-tone power of the VHT-SIG-B field to differ from per-tone power of the preamble training field.

12. The apparatus of claim 11, wherein the transmitter is configured to transmit the frame over a channel, wherein a bandwidth of the channel is about 20 MHz, and wherein the VHT-SIG-B field comprises 26 pre-coded bits.

13. The apparatus of claim 12, wherein the transmitter is configured to transmit the frame over a channel, wherein a bandwidth of the channel is about 80 MHz, and wherein the VHT-SIG-B field comprises four blocks with the same 29 pre-coded bits repeated in each block.

14. The apparatus of claim 11, wherein the transmitter is configured to transmit the frame over a channel, wherein a bandwidth of the channel is about 20 MHz, and wherein the number of subcarriers is 56.

15. The apparatus of claim 14, wherein the number of subcarriers comprises 4 pilot subcarriers and 52 data subcarriers for both the VHT-SIG-B field and the data portion.

16. The apparatus of claim 11, wherein the transmitter is configured to transmit the frame over a channel, wherein a bandwidth of the channel is about 40 MHz, and wherein the number of subcarriers is 114.

17. The apparatus of claim 11, wherein the processing system is configured to generate the frame by:
determining a bandwidth of a channel for the transmitter to transmit the frame;
generating a block of bits based on the determined bandwidth; and
repeating the block of bits a number of times according to the determined bandwidth to generate the VHT-SIG-B field in the frame.

18. The apparatus of claim 17, wherein the determined bandwidth is about 160 MHz, wherein the block of bits comprises 29 pre-coded bits, and wherein the repeating comprises repeating the block of bits eight times such that the VHT-SIG-B field comprises at least 232 pre-coded bits.

19. The apparatus of claim 11, wherein the data portion comprises another field used for scrambler initialization, wherein the other field comprises a cyclic redundancy check (CRC) associated with the other field indicating the length of the useful data.

20. The apparatus of claim 11, wherein the VHT-SIG-B field comprises a long guard interval (GI) of about 800 ns.

21. An apparatus for wireless communications, comprising:
means for generating a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers;
means for applying power scaling to the frame to keep total power of the VHT-SIG-B field equal to total power of a preamble training field while allowing per-tone power of the VHT-SIG-B field to differ from per-tone power of the preamble training field; and
means for transmitting the generated frame.

22. The apparatus of claim 21, wherein the means for transmitting is configured to transmit the frame over a channel, wherein a bandwidth of the channel is about 20 MHz, and wherein the VHT-SIG-B field comprises 26 pre-coded bits.

23. The apparatus of claim 22, wherein the means for transmitting is configured to transmit the frame over a channel, wherein a bandwidth of the channel is about 80 MHz, and wherein the VHT-SIG-B field comprises four blocks with the same 29 pre-coded bits repeated in each block.

24. The apparatus of claim 21, wherein the means for transmitting is configured to transmit the frame over a channel, wherein a bandwidth of the channel is about 20 MHz, and wherein the number of subcarriers is 56.

25. The apparatus of claim 24, wherein the number of subcarriers comprises 4 pilot subcarriers and 52 data subcarriers for both the VHT-SIG-B field and the data portion.

26. The apparatus of claim 21, wherein the means for transmitting is configured to transmit the frame over a channel, wherein a bandwidth of the channel is about 40 MHz, and wherein the number of subcarriers is 114.

27. The apparatus of claim 21, wherein the means for generating is configured to:
determine a bandwidth of a channel for the means for transmitting to transmit the frame;
generate a block of bits based on the determined bandwidth; and
repeat the block of bits a number of times according to the determined bandwidth to generate the VHT-SIG-B field in the frame.

28. The apparatus of claim 27, wherein the determined bandwidth is about 160 MHz, wherein the block of bits comprises 29 pre-coded bits, and wherein the repeating comprises repeating the block of bits eight times such that the VHT-SIG-B field comprises at least 232 pre-coded bits.

29. The apparatus of claim 21, wherein the data portion comprises another field used for scrambler initialization, wherein the other field comprises a cyclic redundancy check (CRC) associated with the other field indicating the length of the useful data.

30. The apparatus of claim 21, wherein the VHT-SIG-B field comprises a long guard interval (GI) of about 800 ns.

31. A computer-program product for wireless communications, comprising a non-transitory computer-readable medium comprising instructions executable to:
generate a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers;
apply power scaling to the frame to keep total power of the VHT-SIG-B field equal to total power of a preamble training field while allowing per-tone power of the VHT-SIG-B field to differ from per-tone power of the preamble training field; and
transmit the generated frame.

32. The computer-program product of claim 31, wherein the instructions are executable to transmit the generated frame by transmitting the frame over a channel, wherein a bandwidth of the channel is about 20 MHz, and wherein the VHT-SIG-B field comprises 26 pre-coded bits.

33. The computer-program product of claim 32, wherein the instructions are executable to transmit the generated frame by transmitting the frame over a channel, wherein a bandwidth of the channel is about 80 MHz, and wherein the VHT-SIG-B field comprises four blocks with the same 29 pre-coded bits repeated in each block.

34. The computer-program product of claim 31, wherein the instructions are executable to transmit the generated frame by transmitting the frame over a channel, wherein a bandwidth of the channel is about 20 MHz, and wherein the number of subcarriers is 56.

35. The computer-program product of claim 34, wherein the number of subcarriers comprises 4 pilot subcarriers and 52 data subcarriers for both the VHT-SIG-B field and the data portion.

36. The computer-program product of claim 31, wherein the instructions are executable to transmit the generated frame by transmitting the frame over a channel, wherein a bandwidth of the channel is about 40 MHz, and wherein the number of subcarriers is 114.

37. The computer-program product of claim 31, wherein the instructions are executable to generate the frame by:
  determining a bandwidth of a channel for transmitting the frame;
  generating a block of bits based on the determined bandwidth; and
  repeating the block of bits a number of times according to the determined bandwidth to generate the VHT-SIG-B field in the frame.

38. The computer-program product of claim 37, wherein the determined bandwidth is about 160 MHz, wherein the block of bits comprises 29 pre-coded bits, and wherein the repeating comprises repeating the block of bits eight times such that the VHT-SIG-B field comprises at least 232 pre-coded bits.

39. The computer-program product of claim 31, wherein the data portion comprises another field used for scrambler initialization, wherein the other field comprises a cyclic redundancy check (CRC) associated with the other field indicating the length of the useful data.

40. The computer-program product of claim 31, wherein the VHT-SIG-B field comprises a long guard interval (GI) of about 800 ns.

41. A method for wireless communications, comprising:
  receiving a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers; and
  decoding the data portion based on the field;
  wherein total power of the VHT-SIG-B field in the frame is equal to total power of a preamble training field when per-tone power of the VHT-SIG-B field differs from per-tone power of the preamble training field.

42. The method of claim 41, wherein the receiving comprises receiving the frame over a channel, wherein a bandwidth of the channel is about 20 MHz, and wherein the VHT-SIG-B field comprises 26 pre-coded bits.

43. The method of claim 42, wherein the receiving comprises receiving the frame over a channel, wherein a bandwidth of the channel is about 40 MHz, and wherein the VHT-SIG-B field comprises two blocks with the same 27 pre-coded bits repeated in each block.

44. The method of claim 41, wherein the receiving comprises receiving the frame over a channel, wherein a bandwidth of the channel is about 20 MHz, and wherein the number of subcarriers is 56.

45. The method of claim 44, wherein the number of subcarriers comprises 4 pilot subcarriers and 52 data subcarriers for both the VHT-SIG-B field and the data portion.

46. The method of claim 41, wherein the receiving comprises receiving the frame over a channel, wherein a bandwidth of the channel is about 80 MHz, and wherein the number of subcarriers is 242.

47. The method of claim 41, wherein the data portion comprises another field used for scrambler initialization, wherein the other field comprises a cyclic redundancy check (CRC) associated with the other field indicating the length of the useful data.

48. The method of claim 41, further comprising stopping the decoding after reaching an end of the useful data based on the length of the useful data.

49. The method of claim 41, wherein the VHT-SIG-B field comprises a long guard interval (GI) of about 800 ns.

50. An apparatus for wireless communications, comprising:
  a receiver configured to receive a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers; and
  a processing system configured to decode the data portion based on the VHT-SIG-B field;
  wherein total power of the VHT-SIG-B field in the frame is equal to total power of a preamble training field when per-tone power of the VHT-SIG-B field differs from per-tone power of the preamble training field.

51. The apparatus of claim 50, wherein the receiver is configured to receive the frame over a channel, wherein a bandwidth of the channel is about 20 MHz, and wherein the VHT-SIG-B field comprises 26 pre-coded bits.

52. The apparatus of claim 51, wherein the receiver is configured to receive the frame over a channel, wherein a bandwidth of the channel is about 40 MHz, and wherein the VHT-SIG-B field comprises two blocks with the same 27 pre-coded bits repeated in each block.

53. The apparatus of claim 50, wherein the receiver is configured to receive the frame over a channel, wherein a bandwidth of the channel is about 20 MHz, and wherein the number of subcarriers is 56.

54. The apparatus of claim 53, wherein the number of subcarriers comprises 4 pilot subcarriers and 52 data subcarriers for both the VHT-SIG-B field and the data portion.

55. The apparatus of claim 50, wherein the receiver is configured to receive the frame over a channel, wherein a bandwidth of the channel is about 80 MHz, and wherein the number of subcarriers is 242.

56. The apparatus of claim 50, wherein the data portion comprises another field used for scrambler initialization, wherein the other field comprises a cyclic redundancy check (CRC) associated with the other field indicating the length of the useful data.

57. The apparatus of claim 50, wherein the processing system is configured to stop the decoding after reaching an end of the useful data based on the length of the useful data.

58. The apparatus of claim 50, wherein the VHT-SIG-B field comprises a long guard interval (GI) of about 800 ns.

59. An apparatus for wireless communications, comprising:
  means for receiving a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers; and
  means for decoding the data portion based on the VHT-SIG-B field;
  wherein total power of the VHT-SIG-B field in the frame is equal to total power of a preamble training field when per-tone power of the VHT-SIG-B field differs from per-tone power of the preamble training field.

60. The apparatus of claim 59, wherein the means for receiving is configured to receive the frame over a channel, wherein a bandwidth of the channel is about 20 MHz, and wherein the VHT-SIG-B field comprises 26 pre-coded bits.

61. The apparatus of claim 60, wherein the means for receiving is configured to receive the frame over a channel, wherein a bandwidth of the channel is about 40 MHz, and wherein the VHT-SIG-B field comprises two blocks with the same 27 pre-coded bits repeated in each block.

62. The apparatus of claim 59, wherein the means for receiving is configured to receive the frame over a channel, wherein a bandwidth of the channel is about 20 MHz, and wherein the number of subcarriers is 56.

63. The apparatus of claim 62, wherein the number of subcarriers comprises 4 pilot subcarriers and 52 data subcarriers for both the VHT-SIG-B field and the data portion.

64. The apparatus of claim 59, wherein the means for receiving is configured to receive the frame over a channel, wherein a bandwidth of the channel is about 80 MHz, and wherein the number of subcarriers is 242.

65. The apparatus of claim 59, wherein the data portion comprises another field used for scrambler initialization, wherein the other field comprises a cyclic redundancy check (CRC) associated with the other field indicating the length of the useful data.

66. The apparatus of claim 59, wherein the means for decoding is configured to stop the decoding after reaching an end of the useful data based on the length of the useful data.

67. The apparatus of claim 59, wherein the VHT-SIG-B field comprises a long guard interval (GI) of about 800 ns.

68. A computer-program product for wireless communications, comprising a non-transitory computer-readable medium comprising instructions executable to:
receive a frame having a preamble portion and a data portion, wherein the preamble portion comprises a Very High Throughput Signal B (VHT-SIG-B) field indicating a length of useful data in the data portion and wherein both the VHT-SIG-B field and the data portion use the same number of subcarriers; and
decode the data portion based on the VHT-SIG-B field;
wherein total power of the VHT-SIG-B field in the frame is equal to total power of a preamble training field when per-tone power of the VHT-SIG-B field differs from per-tone power of the preamble training field.

69. The computer-program product of claim 68, wherein the receiving comprises receiving the frame over a channel, wherein a bandwidth of the channel is about 20 MHz, and wherein the VHT-SIG-B field comprises 26 pre-coded bits.

70. The computer-program product of claim 69, wherein the receiving comprises receiving the frame over a channel, wherein a bandwidth of the channel is about 40 MHz, and wherein the VHT-SIG-B field comprises two blocks with the same 27 pre-coded bits repeated in each block.

71. The computer-program product of claim 68, wherein the receiving comprises receiving the frame over a channel, wherein a bandwidth of the channel is about 20 MHz, and wherein the number of subcarriers is 56.

72. The computer-program product of claim 71, wherein the number of subcarriers comprises 4 pilot subcarriers and 52 data subcarriers for both the VHT-SIG-B field and the data portion.

73. The computer-program product of claim 68, wherein the receiving comprises receiving the frame over a channel, wherein a bandwidth of the channel is about 80 MHz, and wherein the number of subcarriers is 242.

74. The computer-program product of claim 68, wherein the data portion comprises another field used for scrambler initialization, wherein the other field comprises a cyclic redundancy check (CRC) associated with the other field indicating the length of the useful data.

75. The computer-program product of claim 68, further comprising stopping the decoding after reaching an end of the useful data based on the length of the useful data.

76. The computer-program product of claim 68, wherein the VHT-SIG-B field comprises a long guard interval (GI) of about 800 ns.

77. A method for wireless communications, comprising:
generating a frame having a preamble portion and a data portion, wherein the preamble portion comprises a Very High Throughput Signal B (VHT-SIG-B) field, wherein both the VHT-SIG-B field and the data portion use the same number of subcarriers;
applying power scaling to the frame to keep total power of the VHT-SIG-B field equal to total power of a preamble training field while allowing per-tone power of the VHT-SIG-B field to differ from per-tone power of the preamble training field; and
transmitting the generated frame via a channel, wherein the generating comprises:
determining a bandwidth of the channel for the transmitting;
generating a block of bits based on the determined bandwidth; and
repeating the block of bits a number of times according to the determined bandwidth to generate the VHT-SIG-B field in the frame.

78. The method of claim 77, wherein the bandwidth of the channel is about 40 MHz, wherein the block of bits comprises 27 pre-coded bits, and wherein the repeating comprises repeating the block of bits two times such that the VHT-SIG-B field comprises at least 54 pre-coded bits.

79. The method of claim 77, wherein the bandwidth of the channel is about 80 MHz, wherein the block of bits comprises 29 pre-coded bits, and wherein the repeating comprises repeating the block of bits four times such that the VHT-SIG-B field comprises at least 126 pre-coded bits.

80. The method of claim 77, wherein the bandwidth of the channel is about 160 MHz and wherein the VHT-SIG-B field uses about 484 subcarriers.

81. The method of claim 77, wherein the data portion comprises another field used for scrambler initialization, wherein the other field comprises a cyclic redundancy check (CRC) associated with the other field indicating the length of the useful data.

82. The method of claim 77, wherein the VHT-SIG-B field comprises a long guard interval (GI) of about 800 ns.

83. An apparatus for wireless communications, comprising:
a processing system configured to generate a frame having a preamble portion and a data portion, wherein the preamble portion comprises a Very High Throughput Signal B (VHT-SIG-B) field, wherein both the VHT-SIG-B field and the data portion use the same number of subcarriers; and
a transmitter configured to transmit the generated frame via a channel, wherein the processing system is configured to generate the frame by:
determining a bandwidth of the channel for the transmitter to transmit the frame;
generating a block of bits based on the determined bandwidth; and
repeating the block of bits a number of times according to the determined bandwidth to generate the VHT-SIG-B field in the frame;
wherein the processing system is configured to apply power scaling to the frame to keep total power of the VHT-SIG-B field equal to total power of a preamble training field while allowing per-tone power of the VHT-SIG-B field to differ from per-tone power of the preamble training field.

84. The apparatus of claim 83, wherein the bandwidth of the channel is about 40 MHz, wherein the block of bits comprises 27 pre-coded bits, and wherein the repeating comprises repeating the block of bits two times such that the VHT-SIG-B field comprises at least 54 pre-coded bits.

85. The apparatus of claim 83, wherein the bandwidth of the channel is about 80 MHz, wherein the block of bits comprises 29 pre-coded bits, and wherein the repeating comprises repeating the block of bits four times such that the VHT-SIG-B field comprises at least 126 pre-coded bits.

86. The apparatus of claim 83, wherein the bandwidth of the channel is about 160 MHz and wherein the VHT-SIG-B field uses about 484 subcarriers.

87. The apparatus of claim 83, wherein the data portion comprises another field used for scrambler initialization, wherein the other field comprises a cyclic redundancy check (CRC) associated with the other field indicating the length of the useful data.

88. The apparatus of claim 83, wherein the VHT-SIG-B field comprises a long guard interval (GI) of about 800 ns.

89. An apparatus for wireless communications, comprising:
means for generating a frame having a preamble portion and a data portion, wherein the preamble portion comprises a Very High Throughput Signal B (VHT-SIG-B) field, wherein both the VHT-SIG-B field and the data portion use the same number of subcarriers;
means for applying power scaling to the frame to keep total power of the VHT-SIG-B field equal to total power of a preamble training field while allowing per-tone power of the VHT-SIG-B field to differ from per-tone power of the preamble training field; and
means for transmitting the generated frame via a channel, wherein the means for generating is configured to:
determine a bandwidth of the channel for transmitting the frame;
generate a block of bits based on the determined bandwidth; and
repeat the block of bits a number of times according to the determined bandwidth to generate the VHT-SIG-B field in the frame.

90. The apparatus of claim 89, wherein the bandwidth of the channel is about 40 MHz, wherein the block of bits comprises 27 pre-coded bits, and wherein the means for generating is configured to repeat the block of bits by repeating the block of bits two times such that the VHT-SIG-B field comprises at least 54 pre-coded bits.

91. The apparatus of claim 89, wherein the bandwidth of the channel is about 80 MHz, wherein the block of bits comprises 29 pre-coded bits, and wherein the means for generating is configured to repeat the block of bits by repeating the block of bits four times such that the VHT-SIG-B field comprises at least 126 pre-coded bits.

92. The apparatus of claim 89, wherein the bandwidth of the channel is about 160 MHz and wherein the VHT-SIG-B field uses about 484 subcarriers.

93. The apparatus of claim 89, wherein the data portion comprises another field used for scrambler initialization, wherein the other field comprises a cyclic redundancy check (CRC) associated with the other field indicating the length of the useful data.

94. The apparatus of claim 89, wherein the VHT-SIG-B field comprises a long guard interval (GI) of about 800 ns.

95. A computer-program product for wireless communications, comprising a non-transitory computer-readable medium comprising instructions executable to:
generate a frame having a preamble portion and a data portion, wherein the preamble portion comprises a Very High Throughput Signal B (VHT-SIG-B) field, wherein both the VHT-SIG-B field and the data portion use the same number of subcarriers; and
apply power scaling to the frame to keep total power of the VHT-SIG-B field equal to total power of a preamble training field while allowing per-tone power of the VHT-SIG-B field to differ from per-tone power of the preamble training field
transmit the generated frame via a channel, wherein the instructions are executable to generate the frame by:
determining a bandwidth of the channel for transmitting the frame;
generating a block of bits based on the determined bandwidth; and
repeating the block of bits a number of times according to the determined bandwidth to generate the VHT-SIG-B field in the frame.

96. The computer-program product of claim 95, wherein the bandwidth of the channel is about 40 MHz, wherein the block of bits comprises 27 pre-coded bits, and wherein the repeating comprises repeating the block of bits two times such that the VHT-SIG-B field comprises at least 54 pre-coded bits.

97. The computer-program product of claim 95, wherein the bandwidth of the channel is about 80 MHz, wherein the block of bits comprises 29 pre-coded bits, and wherein the repeating comprises repeating the block of bits four times such that the VHT-SIG-B field comprises at least 126 pre-coded bits.

98. The computer-program product of claim 95, wherein the bandwidth of the channel is about 160 MHz and wherein the VHT-SIG-B field uses about 484 subcarriers.

99. The computer-program product of claim 95, wherein the data portion comprises another field used for scrambler initialization, wherein the other field comprises a cyclic redundancy check (CRC) associated with the other field indicating the length of the useful data.

100. The computer-program product of claim 95, wherein the VHT-SIG-B field comprises a long guard interval (GI) of about 800 ns.

101. A method for wireless communications, comprising:
receiving a frame having a preamble portion and a data portion, wherein the preamble portion comprises a Very High Throughput Signal B (VHT-SIG-B) field indicating a length of useful data in the data portion and wherein the VHT-SIG-B field comprises a plurality of replicated blocks, such that bits of one of the blocks are repeated in each of the blocks; and
decoding the data portion based on the VHT-SIG-B field;
wherein total power of the VHT-SIG-B field in the frame is equal to total power of a preamble training field when per-tone power of the VHT-SIG-B field differs from per-tone power of the preamble training field.

102. The method of claim 101, wherein the receiving comprises receiving the frame over a channel, wherein a bandwidth of the channel is about 80 MHz, and wherein the VHT-SIG-B field comprises four blocks with the same 29 pre-coded bits repeated in each of the blocks.

103. The method of claim 101, wherein the receiving comprises receiving the frame over a channel, wherein a bandwidth of the channel is about 160 MHz, and wherein the VHT-SIG-B field comprises eight blocks with the same 29 pre-coded bits repeated in each of the blocks.

104. The method of claim 101, wherein the receiving comprises receiving the frame over a channel, wherein a bandwidth of the channel is about 40 MHz, and wherein the VHT-SIG-B field uses about 114 subcarriers.

105. The method of claim 101, wherein the data portion comprises another field used for scrambler initialization and wherein the other field comprises a cyclic redundancy check (CRC) associated with the other field indicating the length of the useful data.

106. The method of claim 101, further comprising stopping the decoding after reaching an end of the useful data based on the length of the useful data.

107. The method of claim 101, wherein the VHT-SIG-B field comprises a long guard interval (GI) of about 800 ns.

108. An apparatus for wireless communications, comprising:
   a receiver configured to receive a frame having a preamble portion and a data portion, wherein the preamble portion comprises a Very High Throughput Signal B (VHT-SIG-B) field indicating a length of useful data in the data portion and wherein the VHT-SIG-B field comprises a plurality of replicated blocks, such that bits of one of the blocks are repeated in each of the blocks; and
   a processing system configured to decode the data portion based on the VHT-SIG-B field;
   wherein total power of the VHT-SIG-B field in the frame is equal to total power of a preamble training field when per-tone power of the VHT-SIG-B field differs from per-tone power of the preamble training field.

109. The apparatus of claim 108, wherein the receiver is configured to receive the frame over a channel, wherein a bandwidth of the channel is about 80 MHz, and wherein the VHT-SIG-B field comprises four blocks with the same 29 pre-coded bits repeated in each of the blocks.

110. The apparatus of claim 108, wherein the receiver is configured to receive the frame over a channel, wherein a bandwidth of the channel is about 160 MHz, and wherein the VHT-SIG-B field comprises eight blocks with the same 29 pre-coded bits repeated in each of the blocks.

111. The apparatus of claim 108, wherein the receiver is configured to receive the frame over a channel, wherein a bandwidth of the channel is about 40 MHz, and wherein the VHT-SIG-B field uses about 114 subcarriers.

112. The apparatus of claim 108, wherein the data portion comprises another field used for scrambler initialization and wherein the other field comprises a cyclic redundancy check (CRC) associated with the other field indicating the length of the useful data.

113. The apparatus of claim 108, wherein the processing system is configured to stop the decoding after reaching an end of the useful data based on the length of the useful data.

114. The apparatus of claim 108, wherein the VHT-SIG-B field comprises a long guard interval (GI) of about 800 ns.

115. An apparatus for wireless communications, comprising:
   means for receiving a frame having a preamble portion and a data portion, wherein the preamble portion comprises a Very High Throughput Signal B (VHT-SIG-B) field indicating a length of useful data in the data portion and wherein the VHT-SIG-B field comprises a plurality of replicated blocks, such that bits of one of the blocks are repeated in each of the blocks; and
   means for decoding the data portion based on the VHT-SIG-B field;
   wherein total power of the VHT-SIG-B field in the frame is equal to total power of a preamble training field when per-tone power of the VHT-SIG-B field differs from per-tone power of the preamble training field.

116. The apparatus of claim 115, wherein the receiving comprises receiving the frame over a channel, wherein a bandwidth of the channel is about 80 MHz, and wherein the VHT-SIG-B field comprises four blocks with the same 29 pre-coded bits repeated in each of the blocks.

117. The apparatus of claim 115, wherein the receiving comprises receiving the frame over a channel, wherein a bandwidth of the channel is about 160 MHz, and wherein the VHT-SIG-B field comprises eight blocks with the same 29 pre-coded bits repeated in each of the blocks.

118. The apparatus of claim 115, wherein the receiving comprises receiving the frame over a channel, wherein a bandwidth of the channel is about 40 MHz, and wherein the VHT-SIG-B field uses about 114 subcarriers.

119. The apparatus of claim 115, wherein the data portion comprises another field used for scrambler initialization and wherein the other field comprises a cyclic redundancy check (CRC) associated with the other field indicating the length of the useful data.

120. The apparatus of claim 115, wherein the means for decoding is configured to stop the decoding after reaching an end of the useful data based on the length of the useful data.

121. The apparatus of claim 115, wherein the VHT-SIG-B field comprises a long guard interval (GI) of about 800 ns.

122. A computer-program product for wireless communications, comprising a non-transitory computer-readable medium comprising instructions executable to:
   receive a frame having a preamble portion and a data portion, wherein the preamble portion comprises a Very High Throughput Signal B (VHT-SIG-B) field indicating a length of useful data in the data portion and wherein the VHT-SIG-B field comprises a plurality of replicated blocks, such that bits of one of the blocks are repeated in each of the blocks; and
   decode the data portion based on the VHT-SIG-B field;
   wherein total power of the VHT-SIG-B field in the frame is equal to total power of a preamble training field when per-tone power of the VHT-SIG-B field differs from per-tone power of the preamble training field.

123. The computer-program product of claim 122, wherein the instructions are executable to receive the frame by receiving the frame over a channel, wherein a bandwidth of the channel is about 80 MHz, and wherein the VHT-SIG-B field comprises four blocks with the same 29 pre-coded bits repeated in each of the blocks.

124. The computer-program product of claim 122, wherein the instructions are executable to receive the frame by receiving the frame over a channel, wherein a bandwidth of the channel is about 160 MHz, and wherein the VHT-SIG-B field comprises eight blocks with the same 29 pre-coded bits repeated in each of the blocks.

125. The computer-program product of claim 122, wherein the instructions are executable to receive the frame by receiving the frame over a channel, wherein a bandwidth of the channel is about 40 MHz, and wherein the VHT-SIG-B field uses about 114 subcarriers.

126. The computer-program product of claim 122, wherein the data portion comprises another field used for scrambler initialization and wherein the other field comprises a cyclic redundancy check (CRC) associated with the other field indicating the length of the useful data.

127. The computer-program product of claim 122, further comprising instructions executable to stop the decoding after reaching an end of the useful data based on the length of the useful data.

128. The computer-program product of claim 122, wherein the VHT-SIG-B field comprises a long guard interval (GI) of about 800 ns.

* * * * *